March 17, 1931.  E. J. WIENKE  1,797,111
MOTION PICTURE PROJECTOR
Filed Jan. 28, 1928  4 Sheets-Sheet 1

Inventor:
Emil J. Wienke
By Nissen & Crane
Attys

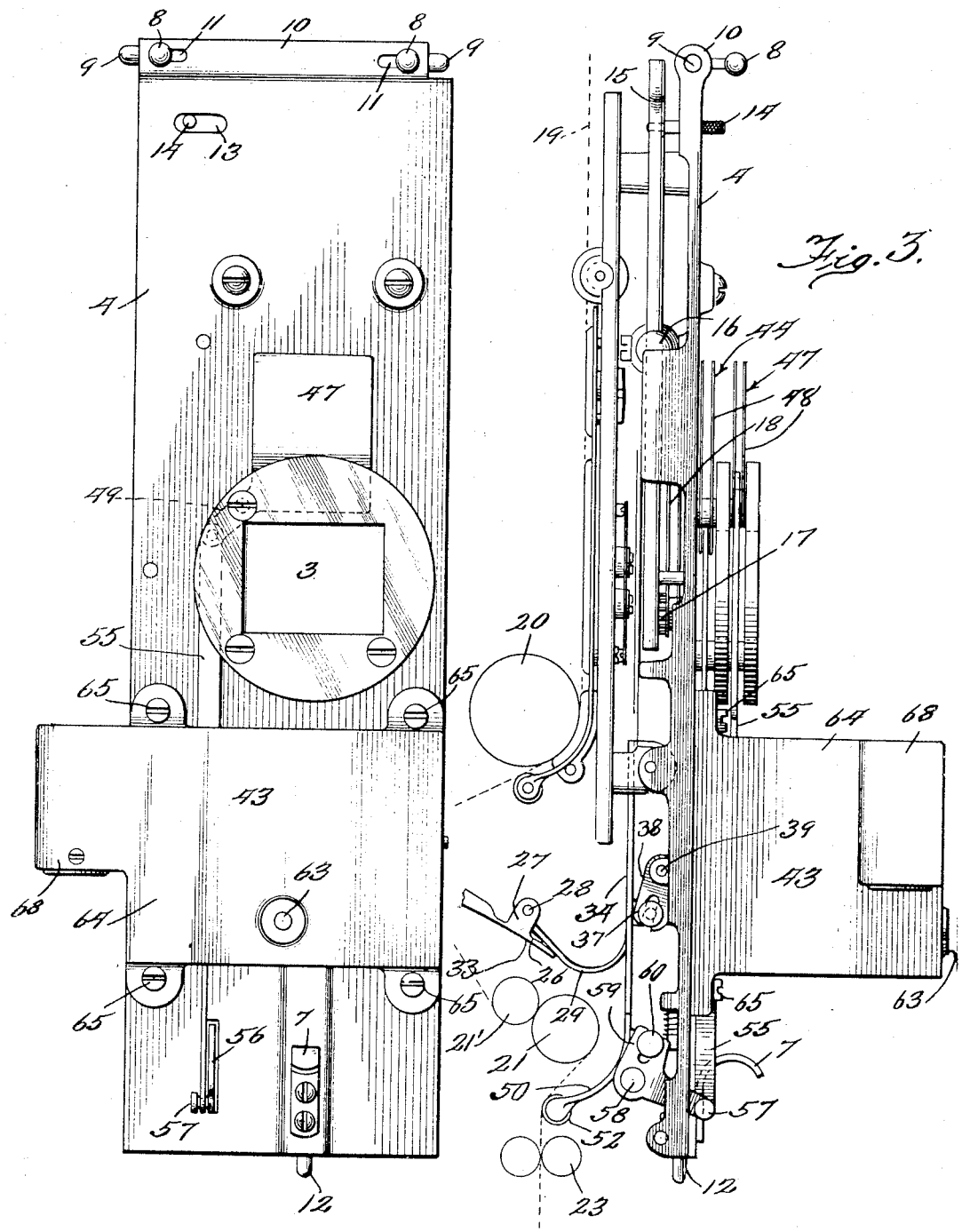

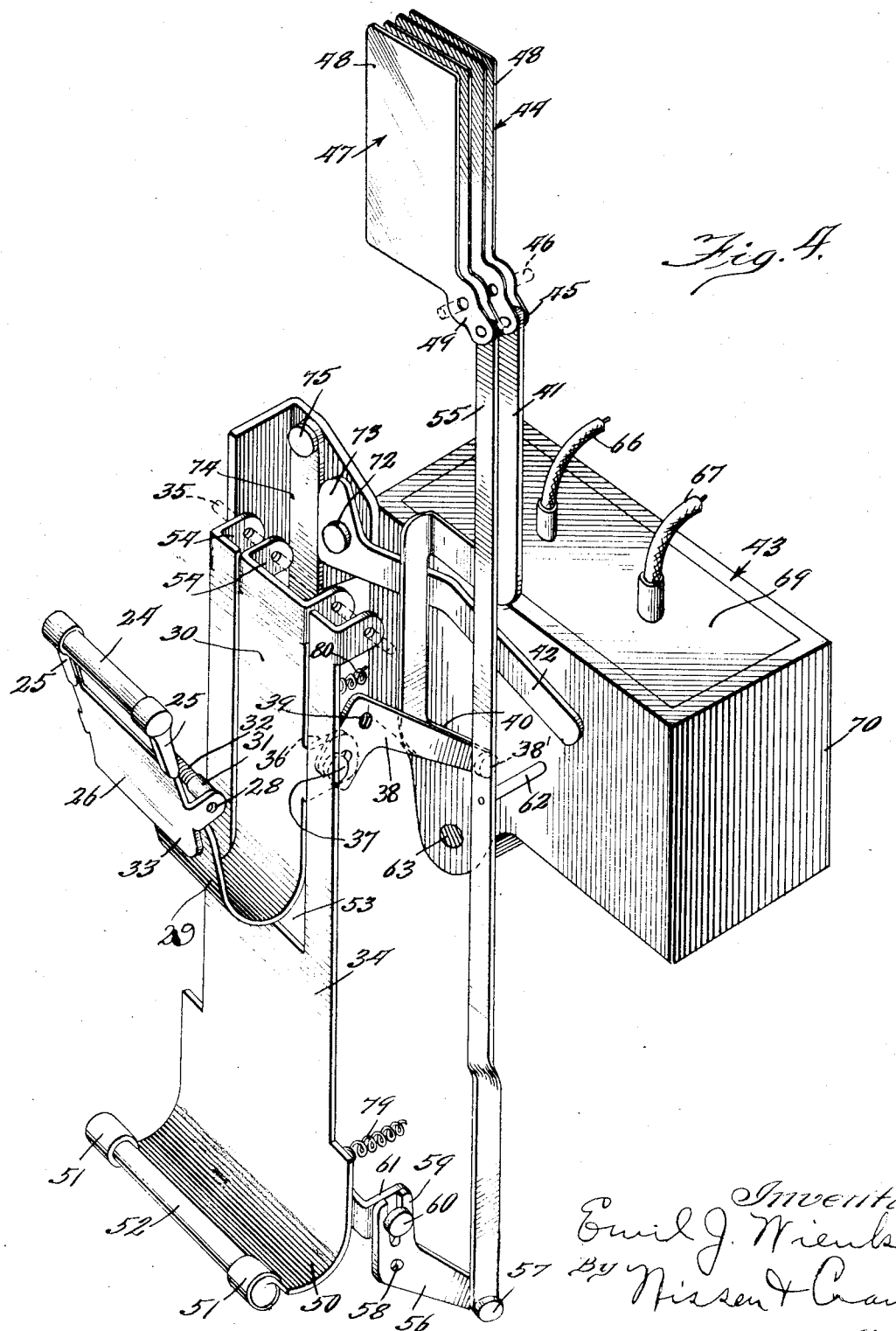

March 17, 1931.                E. J. WIENKE                1,797,111
                         MOTION PICTURE PROJECTOR
                          Filed Jan. 28, 1928        4 Sheets-Sheet 4
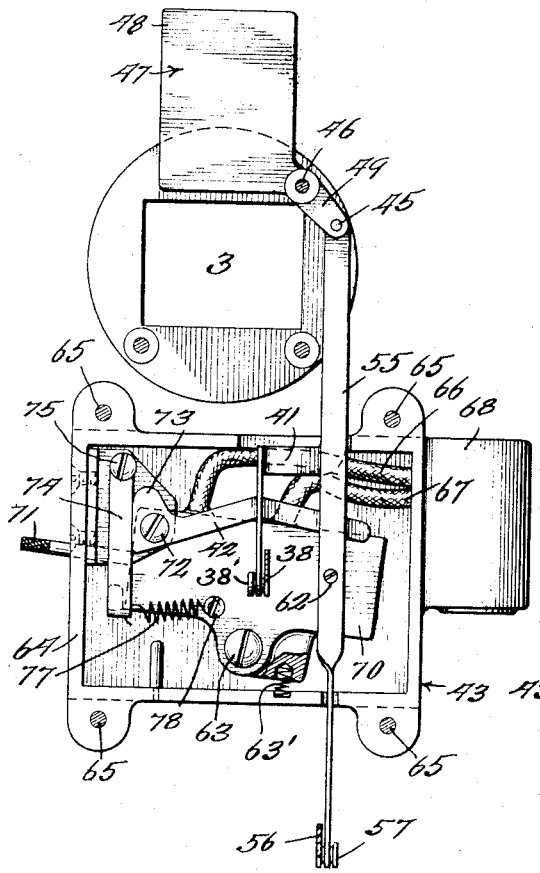
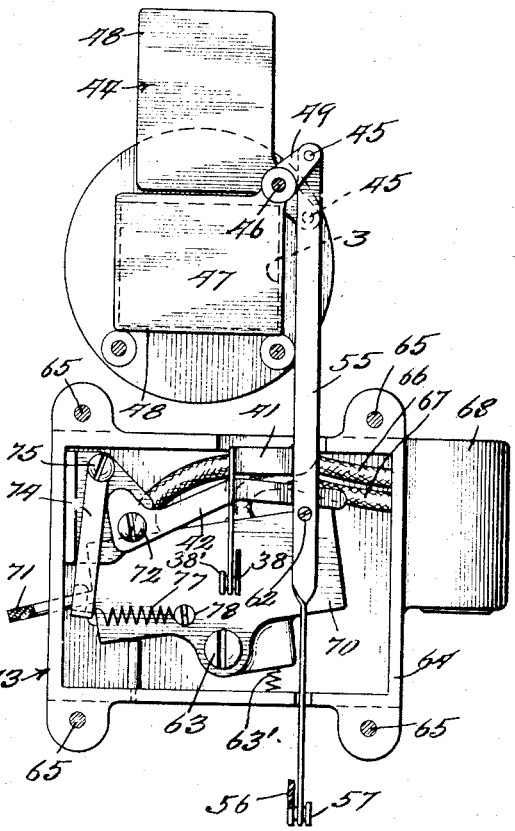
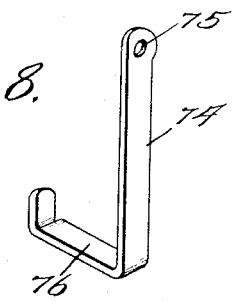
Inventor:
Emil J. Wienke
By Nissen & Crane
    Attys Patented Mar. 17, 1931

1,797,111

UNITED STATES PATENT OFFICE

EMIL J. WIENKE, OF CHICAGO, ILLINOIS, ASSIGNOR TO ENTERPRISE OPTICAL MFG. CO., OF CHICAGO, ILLINOIS, A CORPORATION OF ILLINOIS

MOTION-PICTURE PROJECTOR

Application filed January 28, 1928. Serial No. 250,118.

This invention relates to motion picture projectors and has for its primary object the provision of means for protecting the film against injury in the event that trouble occurs in its feed through the projector.

More specifically, the preferred embodiment of the invention resides in a construction and combination of parts which will be controlled and operated by the film to automatically intercept the light from the lamp house and cut out the drive for the film feeding mechanism should the film break, or should the loop in the film between the intermittent sprocket and the take-up sprocket of the feeding mechanism be straightened out due to an interruption of the film fed past the intermittent sprocket, or should the drive for the take-up reel in the lower magazine be interrupted as it would be if the driving belt therefor breaks. In this way, not only is the film saved from the damaging effect of the light when trouble occurs in the film feed, but the motor is immediately stopped so that the film feeding means will not further damage the film by continuing to feed the same after it is broken or has otherwise been interrupted.

A still further object of the invention is to provide means for conveniently resetting the control for the motor cut-out so that after a repair has been made to the film or an adjustment to the feeding means, the motor may be again thrown into circuit without the necessity of turning on and off the main projector switch.

Other objects of the invention will appear hereinafter, the novel features and combinations being set forth in the appended claims.

In the accompanying drawings:—

Fig. 2 is a view in front elevation of the film gate panel of the projector housing on which the invention is mounted;

Fig. 3 is an edge view in elevation of the film gate panel showing the invention as applied thereto;

Fig. 4 is a skeleton perspective view of the major parts of the invention;

Fig. 5 is a detail view in elevation showing the mechanism of the mercury switch which automatically controls the motor circuit, and showing the switch set for closing the circuit to the motor;

Fig. 6 is a view similar to Fig. 5 but showing the mercury switch tripped to open the circuit to the motor;

Fig. 7 is a top plan view in detail of the mercury switch; and

Fig. 8 is a detail perspective view of the detent for the tripping mechanism of the mercury switch.

Figure 1:
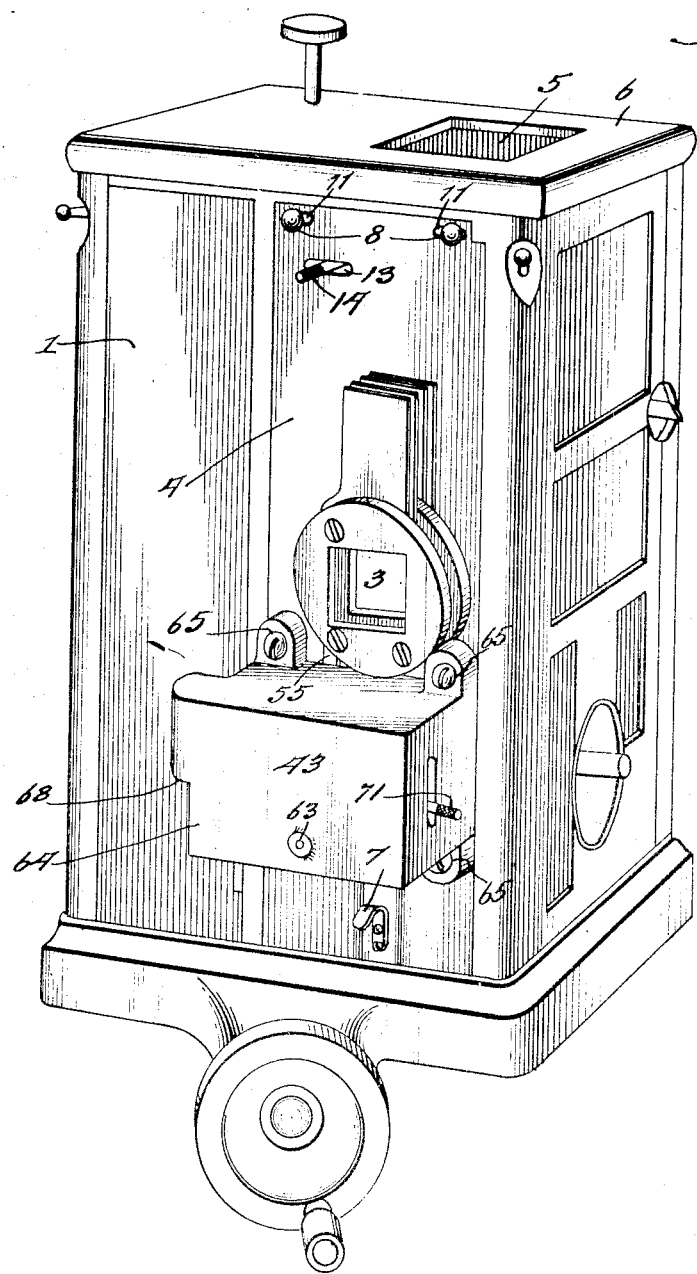
Fig. 1 is a perspective view of a projector illustrating the application of the invention thereto.

In illustrating the application of the invention, I have selected that type of projector known to the trade as the "Motiograph De Luxe projector". It is to be understood, however, that the use of the invention is, in no way, confined to this particular type of projector as, in practice, it will have quite a wide range of use.

This particular type of projector comprises a suitable housing 1 which is supported upon a floor base structure, not shown, and, in operation, it sets in front of the lamp house so that the reflected light from the lamp house is directed through the opening 3 in the film gate panel 4. The film is fed through an opening or slot 5 in the top 6 of the projector housing from an upper magazine, not shown, and is fed down through the projector in front of the opening 3 and wound upon a lower magazine mounted beneath the projector housing and into which the film is fed through an opening in the bottom of the projector housing similar to the opening 5 in the top 6.

The film gate panel 4 is fitted in place and secured by a pull latch 7 at the bottom and a pair of spring-pressed finger latches 8 at the top. To remove the film gate panel, the finger latches 8 are retracted by moving the heads therof toward each other with one hand and by pulling up on the latch 7 with the finger of the other hand. The panel may then be lifted out or removed, and, when removed, it will appear as illustrated in Fig. 2.

In this figure, the finger latches 8 are shown as comprising transverse pins 9 which work in bores made to receive them in the cylindrical end 10 of the panel and each pin having a head projecting through slots 11 to be engaged by the hand so that the pins 9 may be retracted from the openings in the housing in which they are received when the panel is in place. The pull latch 7 has also a pin 12 which is retracted by the curved finger piece on the outside of the panel to retract it from an opening made to receive it in the base part of the housing.

Projecting through a slot 13 in the film gate panel is a pin 14 which is mounted in a vertical rod 15 adjacent the end thereof and the rod is pivoted, as at 16, so that it may be rocked by sliding the pin 14 in the slot 13. The end of the rod 15 is provided with a transverse rack segment which meshes with a pinion 17 and rotates the pinion when the rod 15 is rocked about its pivot by the pin 14. Mounted on the spindle of the pinion 17 is a shutter 18. This shutter is the one that is customarily provided for a projector for intercepting the reflected light through the opening 3 when the film feeding mechanism is stopped or in the event that some difficulty is experienced with the film feed. This shutter 18 is governor-controlled in that when the film feeding mechanism is operating, the governor holds the shutter open, and when the feed is stopped, the influence of the governor is overcome and the shutter moves across the opening 3.

The application of my invention to a projector makes it unnecessary to rely on the shutter 18, to protect the film, but since it, in no way, interferes with the automatic operation of my invention, it may be used when occasion demands and will serve as an extra precaution for the film's protection. The pin 14 is provided to move the shutter away from the opening when it is desired to expose the opening 3 when the projector is not in operation.

In Fig. 3, the dotted line 19 illustrates the path of the film in feeding through the projector. It is fed by the customary intermittent sprocket 20 past the guide roll 21 and over the take-up sprocket 21 to the feed rolls 23 above the outlet opening in the bottom of the projector housing. The film, as shown in Fig. 3, is looped between the guide rolls 21 and the intermittent sprocket 20.

According to the present invention, I provide a roller 24 carried between the bracket pieces 25 which project from the end of the plate 26. The plate, in turn, is made with opposed ears 27 for the pintle 28 which pivotally connects the same to the upwardly curved end 29 of the actuating lever 30. This upwardly curved end of the actuating lever 30 is made with sleeves 31 through which the pintle 28 extends and a spring 32 is coiled around the pintle between the sleeves 31 with one end pressing against the plate 26 so as to hold the tail piece 33 thereof against the side of the upwardly curved end of the actuating lever 30. The tail piece 33 of the plate 26 is slightly curved at its end so as to fit the contour of the curved end 29 of the actuating lever.

The actuating lever 30 is co-axially pivoted with the other actuating lever 34 upon an elongated pivot pin 35, each of the levers in this respect having ears with registering openings therein through which the pin 35 extends, as clearly shown in Fig. 4. Projecting from one edge of the actuating lever 30 is an ear 36 which carries a headed pin 37 with the head of the pin spaced from the side of the ear. This provides an annular recess for the reception of the bifurcated end of the bell crank 38. The bell crank is pivoted, as at 39, to the casting of the film gate 4, and the longer arm thereof extends rearwardly of the actuating lever 30 and is connected to a parallel extension 40 on the end of the shutter bar 41. The end of the bell crank and the end of the extension 40 of the shutter bar 41 terminate at substantially the same place and the end of the shutter bar is pivoted to the bell crank 38 and is so formed as to co-operate with the end of the bell crank to provide a projecting shoulder 38', so to speak, which is positioned below the trigger 42 of the mercury switch, generally represented as at 43 and which will be hereinafter more particularly referred to. Inward movement of the actuating lever 30 will rock the bell crank 38 about its pivot 39, raising the end 38' of the same against the trigger 42 and tripping the switch. Simultaneously with this movement, the shutter bar 41 will be raised which will lower the shutter 44 across the opening 3 and intercept the light reflected therein.

The shutter 44 is pivotally connected, as at 45, to the end of the shutter bar 41 and it is also pivotally supported by the pin 46. Adjacent the shutter 44 is a companion shutter 47 which is independently actuated by the actuating lever 34 to also extend across the opening 3 and intercept the light reflected therein. Both of the shutters 44 and 47 may be constructed alike and each comprises spaced parallel plates 48 cut to leave divided attaching ears 49 at one of their four corners with registering openings therein for the pin 46. The reason for making the shutters with spaced plates is to provide an air space between the plates for insulating purposes so that they will not become too hot when intercepting the reflected light. The actuating lever 34, like the lever 30, is made with an upwardly curved end 50 having integral sleeves 51 for the roller 52. This lever is wider than the lever 30 and is made with an elongated slot 53 in which the lever 30 is free to move. In this way, both of the levers may be mounted for independent pivotal movement without interfering with one another and at the same time taking up as little space as possible. The suspended ends of the levers 30 and 34 are each made with a pair of projecting ears 54 having alined openings through which the pin 35 extends. They are thus pivotally mounted on a pin common to both and yet suspended with freedom of independent pivotal movement. The bar 55 for the shutter 47 is connected to its respective shutter in the same manner that the bar 41 is connected to the shutter 44 and extends downwardly out of contact with its associated levers and other parts of the mechanism to its connection with the bell crank 56. Its connection with the bell crank 56 is made at the pivot 57 on the end of the bell crank, and the bell crank, in turn, is pivoted, as at 58, with the upwardly presented extension 59 having an open slot or bifurcation for engaging the pin 60 between the head thereof and the L-shaped ear 61 which is secured in any suitable manner to the actuating lever 34. The shutter bar 55 is provided with a transverse pin 62 which is presented beneath the trigger 42 so that when the bar 55 is elevated to throw the shutter 47 across the opening 3, the pin 62 will be intercepted by the trigger 42 which will trip the trigger mechanism of the mercury switch 43.

Figs. 5 to 8, inclusive, illustrate the tripping mechanism for the mercury switch 43 and from these figures, it will be seen that the switch is pivotally mounted, as at 63, within a cover 64, the cover being secured to the outer face of the film gate panel 4 by the screws 65. This attachment for the cover is shown to the best advantage in Figs. 1 and 2. The mercury switch is of conventional construction so far as concerns its internal construction, being an ordinary glass tube with contacts at one end therein which are bridged by the mercury when the switch is tilted in one direction to bring that end lower than the opposite end and cause the mercury to flow into that lowered end. The contacts within the switch are connected with the lead wires 66 and 67 which extend to the plug socket 68 on one side of the cover 64. The plug socket 68 is adapted to receive a plug from the motor circuit of the machine so as to connect the mercury switch in the circuit. The mercury switch is embedded in a hardened compound indicated as at 69 in the top plan view in Fig. 7, and a casting or other box-like receptacle 70 serves to hold the switch and the compound in which it is embedded. It also provides a suitable means for pivoting the switch, as at 63.

Projecting from one side of the casting 70 and through a slotted opening in one side of the cover 64 is a pin 71 which may be engaged by the operator to return the switch to its initial position after it has been tripped by the tripping mechanism under the control of either of the shutter bars 41 or 55. The tripping mechanism for the switch, as previously stated, comprises the trigger 42, the same being pivoted as at 72, and having a wiping contact with the detent 74. The detent comprises an L-shaped rod pivotally suspended, as at 75, and extending along one end of the switch so that its transverse extension 76 (Fig. 7) may serve as a ledge to engage the edge of the switch casting 70 and hold the same in its initial position, as shown in Fig. 5. The detent is under the influence of a spring 77 which is connected at one end to the detent and with its other end anchored to the side of the switch casting 70 as at 78. This spring will hold the supporting ledge on the extension 76 of the detent just under the lower edge of the switch casting 70 and thus retain the same in its initial position. When the trigger 42 is tripped, the camming head 73 wipes against the side of the detent 74 and moves the same against the resistance of the spring 77 to release the switch. A coil spring 63' is positioned under the switch to the right of the pivot 63, as viewed in Figs. 5 and 6, of the drawing, and when the switch is released by the tripping mechanism, the spring will function to tilt the same into the position shown in Fig. 6.

To again reset the switch to its initial position, the pin 71 is engaged by the hand of the operator and moved upwardly which rocks the switch casting 70 about its pivot 63 and again sets the switch.

Returning to Fig. 3, it will be seen that the film indicated by the dotted line 19 is looped around the roller 24, and then, after passing the guide rolls 21' and take-up sprocket 21, extends across the roller 52. Both of the actuating levers 30 and 34 are under the influence of coiled springs, the spring for the lever 34 being shown as at 79 in Fig. 4, and the spring for the lever 30 being shown as at 80 in Fig. 4. Both of these springs impart an outward thrust to their respective levers and hold them at the limit of their extended positions. In operation, however, these levers work oppositely. This is realized as the result of arranging their connections with the shutter bars 41 and 55 so that an outward movement of the lever 34 will raise the bar 55 and project the shutter 47 from its initial inactive position to its projected position across the opening 3. With the lever 30, however, the inward movement of the same, and not outward as in the case of the lever 34, projects the shutter 44 from its initial inactive position to its active position across the opening 3. In this way, both the bar 41 and the bar 55 are elevated to move the shutters across the light opening as it is the elevating movement of these bars that actuates the trigger 42. The opposite operation of the actuating levers is necessary to reset the shutters 44 and 47 in their inactive positions.

Should the film feed past the intermittent sprocket 20 be interrupted, the loop around the actuating lever 30 will straighten out and impart a thrust to the lever 30 and, if the tension is severe enough, it will overcome the influence of the spring 80 and move the lever inwardly, which will elevate the shutter bar 41 and project the shutter 44 across the opening 3, thus intercepting the light from the lamp house. Upon this operation, the actuating end 38' of the bell crank 38 will trip the trigger 42, rocking the same about its pivot 72, causing the camming head 73 to wipe against the detent 74, and moving the same out of supporting relation to the mercury switch, permitting the switch to drop into a position shown in Fig. 6, whereupon the mercury contained therein will flow to the end of the switch, breaking the contact for the leads 66 and 67 and, thus, interrupting the circuit to the motor which is driving the film. The mechanism of the projector immediately stops before any further winding damage may be made to the film. At the same time, the light is intercepted by the shutter 44 and the film is in no danger of being destroyed from this source.

It may so happen that the tension of the film against the actuating lever 30, although sufficient to make the lever active, has not caused the film to break. In this case, the motor is automatically stopped in time to arrest the feeding of the film before the tension has been severe enough to break the film, in which event the necessary adjustments may be made to correct the film feed and, after this is accomplished, the operator need only raise the pin 71, resetting the switch, and the mechanism will again proceed in operation. After the tension of the film has been corrected, the spring 80 will have forced the actuating lever 30 outwardly, thus raising the shutter 44 into its normal inactive position to expose the opening 3. It will thus be seen that the actuating lever 30 is operated by the film when the loop straightens out and its operation is entirely independent of the lever 34. Its sole purpose, at least for all practical reasons, is to throw the shutter across the opening 3 and cut off the motor when the loop of the film is straightened out beyond a normal degree and which might result in breaking the film or otherwise interrupting its feed, unless corrected. The pivot plate 26 functions only to move out of the way of the guide rolls 21' when they are lifted up to thread the film through them.

When the loop in the film is straightened out from one cause or another, the pull will be downward which will pull the plate 26 downward with the tail piece 33 resting against the face of the actuating lever 30 and limiting any further downward movement of the plate so that the tension of the film is transmitted directly to the actuating lever, and, if the same is sufficient to overcome the influence of the spring 80, it will move the lever inward, throw the shutter 44, and throw the mercury switch.

There should be little, if any, free play between the actuating lever and the shutter 44 so that the shutter 44 will respond immediately to the movement of the actuating lever. This is also true of the tripping mechanism for the mercury switch.

The operation of the actuating lever 34, as above mentioned, is directly opposite to that of the lever 30. The spring 79 normally imparts an outward thrust to the lever 34 and its extended outward position in this respect holds the shutter bar 55 up and, as a result, the shutter 47 is projected across the opening 3. When the film is feeding through the projector, the tension of the same, when feeding across the roller 52, holds the actuating lever 34 inwardly against the influence of the spring 79 in which position it imparts a downward pull to the shutter bar 55, thus holding the shutter 47 up alongside the shutter 44. Should the film break, the tension on the actuating lever 34 will thus be removed and the spring 79 will move the same outwardly which will impart an upward thrust to the shutter bar 55, projecting the shutter 47 across the opening 3 and intercepting the light. This upward movement of the shutter bar 55 will bring the pin 62 in contact with the trigger 42 and tripping the mercury switch in the same manner as described with reference to the operation of the actuating lever 30.

It should be perfectly clear from the description that a projector, equipped with my film controlled shutters and automatic switch, will safeguard the film against fire, not only should the film break but even in the event that the tension of the film is abnormally increased so that it might break if the film feed is not stopped. Not only will the invention serve as a safeguard against fire but it will also cut out the motor for the film feed when anything goes wrong with the feed and thus avoid the possibility of the film being damaged by the operation of the machine after the feed has been interrupted or interfered with.

Another important advantage of the use of the invention is the automatic cut-off when the film has been wound on the lower magazine. Just as soon as the end of the film passes the roller 52 on the actuating lever 34, the tension on the actuating lever is, of course, relieved and the same will function to automatically cut off the motor instead of leaving this for the operator to do.

The incorporation of my improvements in a projector in no way interferes with the manual manipulation of the starting and stopping of the projector nor does it interfere with the manually operated fire shutter, referred to as 18 in Fig. 3.

Should the drive belt for the take-up reel in the lower magazine be interrupted, as it would be if the driving belt therefor breaks, the feed of the film across the roller 52 on the actuating lever 34 will, of course, be interrupted and the tendency of the film would be to feed back through the feed rolls 23 and as a result tension on the roller 52 of the actuating lever 34, would be relieved, the same as when the film breaks or when the end of the film feeds past the roller 52. The actuating lever 34 then would be free to respond to the outward thrust of the spring 79 which would actuate the shutter bar 55 to throw the shutter 47 and trip the mercury switch, as previously described.

From the above description, it will be seen that I have provided film responsive means, or film controlled means, which is adapted to operate the mercury switch and the light shutters as a result of different abnormal conditions in the film feed and in this way I can provide for absolute protection to the film both against damage by the light and against the damage that would result if the feeding mechanism continued to operate after the normal feed of the film was interrupted.

Obviously those skilled in the art may make various changes in the construction and arrangement of parts without departing from the spirit and scope of the invention as defined by the claims hereto appended, and I therefore do not wish to be restricted to the precise construction contained herein.

Having thus described and shown an embodiment of my invention, what I claim and desire to secure by Letters Patent of the United States is:—

1. In a projecting apparatus, the combination with a member arranged between the source of light in said projector and the film, of an opening in said member through which light is permitted to pass to said film, a plurality of levers concentrically pivoted to said member and having film engaging portions, shutters operated by each of said levers to close said opening, one of said levers being of greater length than the other of said levers to position the levers adjacent different portions of said film, one of said levers being adapted to normally engage the film as it is being fed through the apparatus and the other of said levers being normally out of engagement with the film as the film is being fed through the apparatus, each of said levers being adapted to be operated to close a shutter mounted on said member when a condition arises during the operation of the apparatus wherein either of the normal positions of the levers are disturbed by the action of the film, each shutter in closed position closing the opening in said member.

2. An apparatus as claimed in claim 1 in which portions of said levers lie substantially in the same plane while in their normal position during the operation of the apparatus.

3. In a motion picture apparatus, of a gate adapted to be positioned between the film and the source of light in said apparatus, concentrically pivoted levers pivoted to said gate, springs for moving said levers away from said gate, an opening in said gate through which light is adapted to pass to the film, a shutter for said opening, an arm connected thereto, a bell crank lever having one end pivoted to said arm and the other to one of said levers, a second shutter for closing said opening, an arm pivoted thereto, a second bell crank lever pivoted to said last mentioned arm and to the other of said levers, a projection on each of said arms, a gravity operated switch mounted on said gate, a releasable catch for holding said gravity operated switch against the force of gravity, one of said levers adapted to be moved in one direction to close its respective shutter and the other of said levers being adapted to be moved in the other direction to close its respective shutter, one of said levers being operable by an increased tension in the film at one point to close its shutter and the other lever being operable by a decrease in the tension at another point, and said releasable catch being operable simultaneously with the movement of either of said shutters to closed position to release said gravity operated switch and permit it to fall under the force of gravity to open the circuit to the means for feeding the film.

4. A device as claimed in claim 3, in which the lever which is operated by the increased tension in the film has a yielding means mounted on the film engaging end thereof to prevent said lever from closing its respective shutter when only a small amount of increased tension occurs in said film.

5. A device as claimed in claim 3, in which the lever which operates by increased tension in the film is provided with a plate pivoted to the end thereof and yieldingly urged in the direction of said film so as to prevent small increases in tension from operating said shutter.

In testimony whereof I have signed my name to this specification on this 26th day of January, A. D. 1928.

EMIL J. WIENKE.